United States Patent [19]

Hayes et al.

[11] Patent Number: 4,613,260

[45] Date of Patent: Sep. 23, 1986

[54] THREAD CUTTING DIE HEAD FOR POWER DRIVEN THREADING MACHINES

[75] Inventors: Robert J. Hayes, Westlake; Ronald M. Mahl, Avon Lake, both of Ohio

[73] Assignee: Emerson Electric Co., St. Louis, Mo.

[21] Appl. No.: 732,666

[22] Filed: May 10, 1985

[51] Int. Cl.[4] .......................... B23G 1/02; B23G 5/12
[52] U.S. Cl. ................................ 408/74; 10/96 T; 10/120.5 R; 408/148; 408/178
[58] Field of Search ............... 10/87, 94, 96 R, 96 T; 408/73, 74, 148, 149, 173–178

[56] References Cited

U.S. PATENT DOCUMENTS

| | | | |
|---|---|---|---|
| 1,396,989 | 11/1921 | Breitenstein | 10/96 T |
| 1,527,185 | 2/1925 | Hall | 10/96 T |
| 1,701,846 | 2/1929 | Harrison | 10/96 R |
| 2,271,641 | 2/1942 | Hogg | 10/120.5 |
| 2,556,742 | 6/1951 | Strickland | 10/120.5 |
| 2,710,979 | 6/1955 | Strickland | 408/148 X |
| 3,820,180 | 6/1974 | Birkestrand et al. | 10/96 R |
| 4,023,211 | 5/1977 | Miyagawa | 10/96 |
| 4,370,770 | 2/1983 | Wagner | 10/96 R |

FOREIGN PATENT DOCUMENTS 18988 of 1911 United Kingdom ............... 10/96 T

Primary Examiner—E. Michael Combs
Attorney, Agent, or Firm—Body, Vickers & Daniels

[57] ABSTRACT

An annular thread cutting die head for a power driven threading machine is comprised of an annular support plate supporting a plurality of radially displacable thread cutting dies spaced apart about the axis of the die head, and an annular cam plate assembly coaxial with and pivotal relative to the support plate to radially displace the cutting dies. The cam plate assembly is spring biased to pivot relative to the support plate in the direction to radially retract the cutting dies, and is selectively operable relative to the support plate to achieve the cutting of a straight thread or to achieve the cutting of a tapered thread. In connection with the cutting of a tapered thread, receding replacement of the cutting tools is controlled by a unique cam arrangement on the machine carriage engaged by the cam plate assembly under the spring bias and independent of torque imposed on the die head during the threading operation.

41 Claims, 10 Drawing Figures

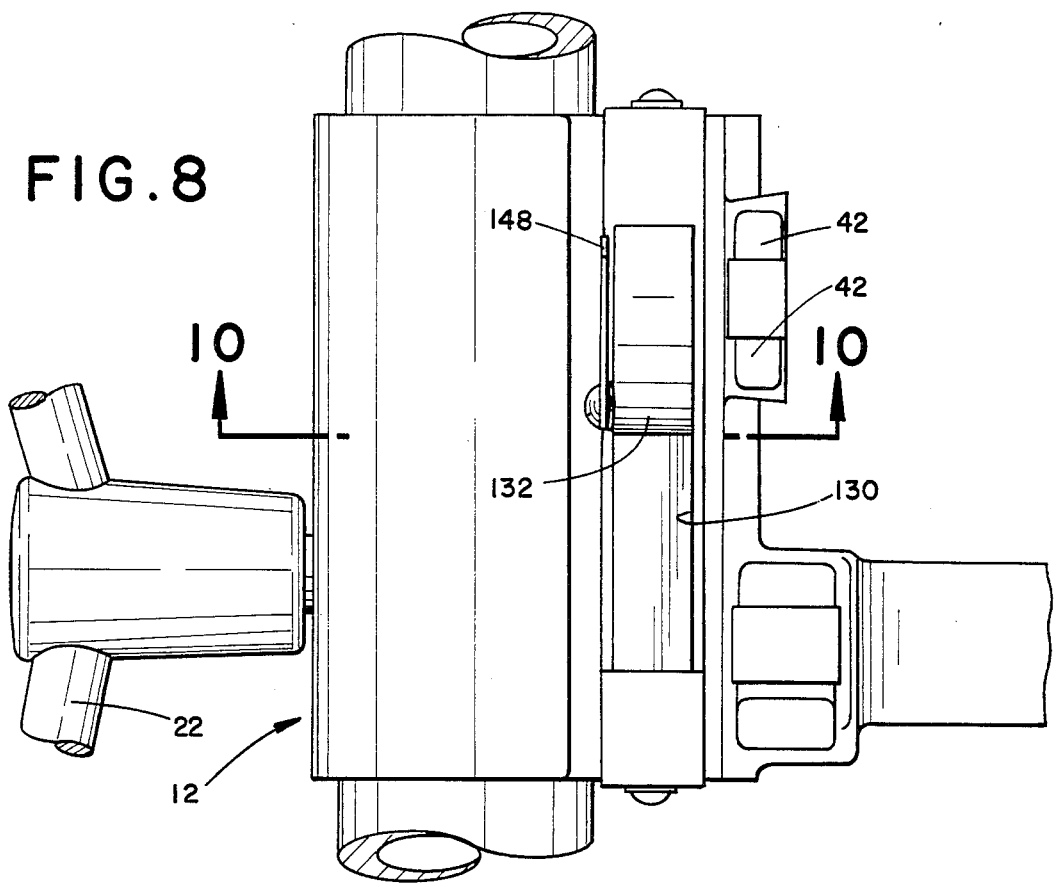
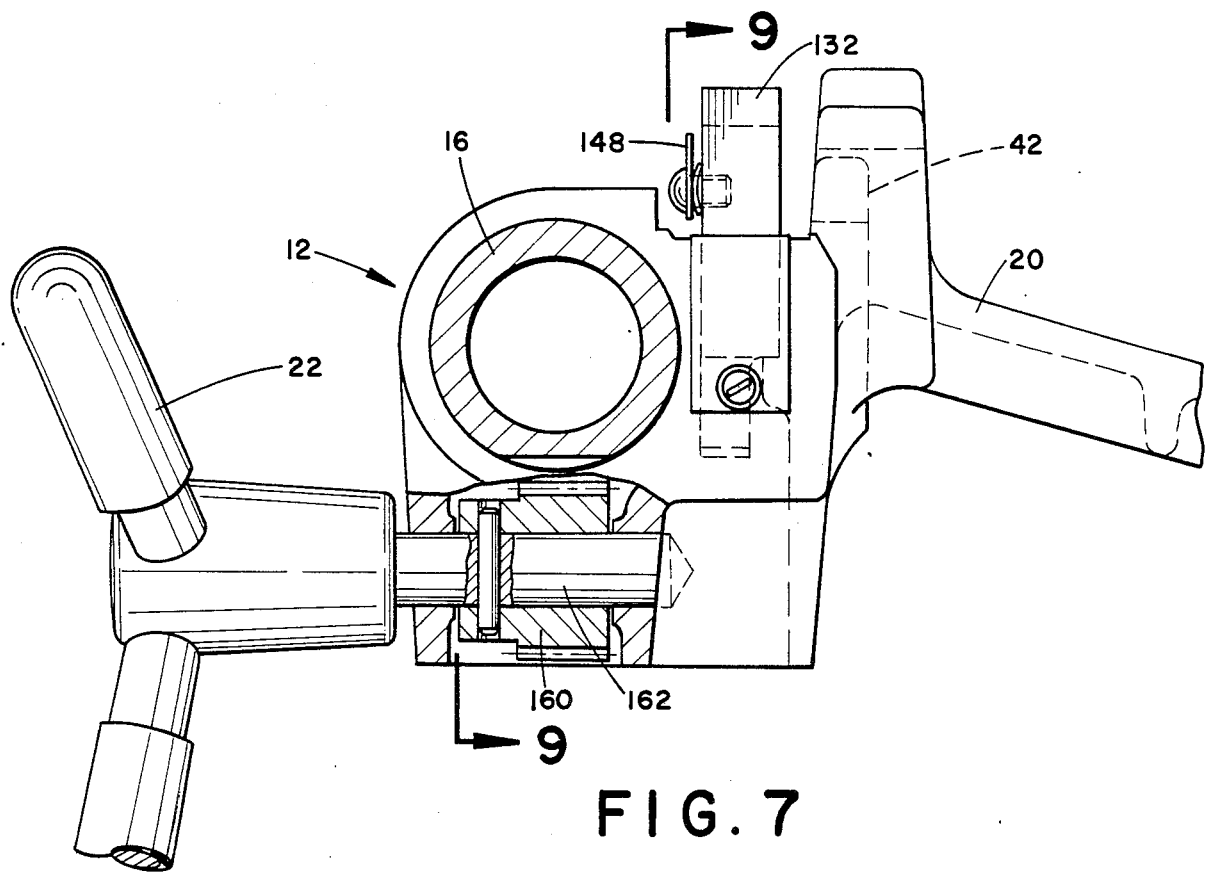

THREAD CUTTING DIE HEAD FOR POWER DRIVEN THREADING MACHINES

BACKGROUND OF THE INVENTION

The present invention relates to the art of power driven threading machines and, more particularly, to an improved thread cutting die head construction, and improved control of receding thread cutting dies in connection with the cutting of a tapered thread on a workpiece.

Power driven thread cutting machines are of course well known and basically comprise a rotatable spindle and chuck assembly for rotating a workpiece to be threaded, and a thread cutting die head supported on a tool carriage for axial displacement relative to the workpiece to advance thread cutting dies supported by the die head into thread cutting engagement with the end of the workpiece. Generally, the die head assembly is pivotally supported on one side of the tool carriage for displacement between stored and use positions. In the use position the axis of the die head is aligned with the workpiece axis, and the side of the die head opposite the pivotal mounting engages the corresponding side of the tooling carriage to axially and vertically support the die head in the use position.

Receding die heads are likewise known and operate to cut a tapered thread on a workpiece by providing for the thread cutting dies to progressively recede radially relative to the workpiece during axial advancement of the cutting dies in thread cutting engagement with the workpiece. In such a receding die head, radial receding movement of the cutting dies during the thread cutting operation has been achieved heretofore in a manner shown for example in U.S. Pat. No. 4,023,211 to Miyagawa. More particularly in this respect, the thread cutting dies are supported on a plate member of the die head assembly which is pivotal about the die head axis. The pivotal plate member has a radial arm which engages a ramp or cam component supported on the carriage assembly. The torque developed by engagement of the cutting dies with a workpiece pivotally displaces the plate member for the arm to force the ramp component downwardly against an underlying carriage support rail. Thereafter, the carriage and die head move relative to the ramp with the cutting dies in cutting engagement with the workpiece, and the arm of the pivotal plate member follows the contour of the ramp as a result of the torque force. Accordingly, the pivotal plate pivots relative to the die head during axial advancement thereof, and such relative pivotal displacement causes the cutting dies to progressively recede radially during the thread cutting operation. When the arm reaches the end of the ramp and drops therefrom, the cutting tools are rapidly displaced radially outwardly to clear the workpiece and terminate the threading cutting operation.

Die head structures of the foregoing character and control of the receding displacement of thread cutting dies in the manner disclosed in the Miyagawa patent are disadvantageous for a number of reasons. For example in this respect, the torque developed during engagement of the thread cutting dies and workpiece is erratic, whereby positive displacement of the ramp component into stable engagement with the underlying carriage support rail at the beginning of the operation is not assured. Further, fixed axial positioning of the ramp component relative to the moving carriage is necessary, and such positioning is likewise not assurable because of the erratic force application on the arm of the pivotal plate member. Still further, the torque generated during the cutting operation is not uniform, and this can lead to non-uniform force engagement between the pivotal plate arm and ramp and thus non-uniform wear of the engaging surfaces. Moreover, the area between the underside of the ramp and the carriage support rail is susceptible to the reception of dirt, oil and metal chips, and such foreign matter interposed between the ramp and support rail can cause wear and/or damage thereto and, more importantly, can distort the intended profile of the ramp relative to horizontal and thus the desired taper of the thread being cut. All of these disadvantages, individually or collectively, affect the ability to achieve accurate thread cutting and/or consistently uniform thread cutting. A further disadvantage with the arrangement as disclosed in the Miyagawa patent resides in the fact that a tapered thread can be cut in only one direction on a workpiece, namely that direction in which the torque generated will result in displacement of the ramp downwardly against the carriage support rail.

SUMMARY OF THE INVENTION

In accordance with one aspect of the present invention, a threading cutting die head construction is provided by which the foregoing disadvantages attendant to torque responsive control of thread cutting tool displacement are avoided, thus promoting the consistently uniform and accurate cutting of a tapered thread, and enabling the cutting of both right and left hand threads with the same die head structure and mounting relative to the machine carriage. More particularly in this respect, a die head construction according to the present invention provides for the thread cutting dies to be supported for radial inward and outward displacement relative to the axis of the die head by a support plate which is pivotally fixed relative to the die head axis. Radial displacement of the cutting dies is controlled by a cam plate arrangement which is coaxial with and pivotally displacable relative to the die head axis, and the cam plate arrangement is biased to pivot relative to the support plate in the direction to cause receding radial displacement of the cutting dies relative to the die head axis. The cam plate arrangement includes an arm adapted to engage a ramp or cam component on the tool carriage in connection with the cutting of a tapered thread, and the biasing force on the cam plate arrangement is constant and independent of torque imposed on the support plate as a result of cutting engagement between the cutting dies and a workpiece. Accordingly, neither the magnitude nor the varying torque generated during engagement of the cutting dies with the workpiece has any effect on the interengaging relationship between the arm and ramp, whereby consistently uniform and accurate thread cutting is promoted. Further, as will become apparent from the description of a preferred embodiment hereinafter, the thread cutting die head according to the present invention advantageously enables control of the positioning of the thread cutting dies to selectively provide for the cutting of a straight thread or a tapered thread on a given workpiece.

In accordance with another aspect of the present invention, an improved ramp assembly is provided which assures positive initial positioning of the ramp relative to the die head upon engagement of the cam plate arm with the ramp, and positive relative positioning between the die head and ramp during the cutting of a tapered thread. Such positive positioning avoids inaccuracies at the beginning of a thread cutting operation and assures accuracy and uniformity of thread cutting throughout the cutting operation. More particularly in this respect, the underside of the ramp is toothed and the ramp is supported so as to be displaced downwardly to interengage with a pinion therebeneath in the tool carriage upon displacement of the arm of the cam plate arrangement into engagement with the ramp. Further, the pinion is rotated in response to axial displacement of the carriage and thus the die head to achieve positive relative axial displacement between the ramp and the arm of the cam plate during the cutting of a tapered thread. The threaded interengagement between the pinion and ramp assures continuous positive and accurate relative positioning and displacement between the die head and ramp throughout the thread cutting operation.

It is accordingly an outstanding object of the present invention to provide an improved thread cutting die head construction for use with power driven threading machines.

Another object is the provision of an improved receding die head construction which enables optimizing consistency with respect to the uniformity and accuracy of cutting of tapered threads.

A further object is the provision of an improved receding die head construction of the foregoing character operable to control the taper and length of the thread independent of torsional forces imposed on the die head during thread cutting interengagement with a workpiece.

Yet a further object is the provision of a receding die head construction of the foregoing character wherein control of the taper and length of the thread is achieved through the use of a constant force biasing arrangement for displacing the thread cutting dies radially of the die head during a thread cutting operation.

Still another object is the provision of an improved cam or ramp assembly which is cooperable with a receding die head to control the taper and length of a thread cut on a workpiece in a manner which is more reliable and efficient than with arrangements heretofore available.

Still another object is the provision of a cam or ramp assembly which is positively interengaged with and driven by a gear element associated with the tool carriage of a threading machine so as to assure positive positioning of the ramp relative to the die head at the beginning of a thread cutting operation and to assure positive relative axial displacement between the ramp and die head during the thread cutting operation.

Yet a further object is the provision of a receding die head of the foregoing character operable in a given mounted orientation on the tooling carriage of a threading machine to enable the cutting of both right and left hand threads on workpieces.

Still a further object is the provision of a die head construction of the foregoing character selectively operable to cut a straight thread or to cut a tapered thread.

BRIEF DESCRIPTION OF THE DRAWINGS

The foregoing objects, and others, will in part be obvious and in part pointed out more fully hereinafter in conjunction with the written description of preferred embodiments of the invention illustrated in the accompanying drawings and in which:

FIG. 7 is an end elevation view of the threading machine carriage looking in the direction from right to left in FIG. 1;

FIG. 8 is a plan view of a portion of the carriage;

DESCRIPTION OF PREFERRED EMBODIMENTS

Figure 1:
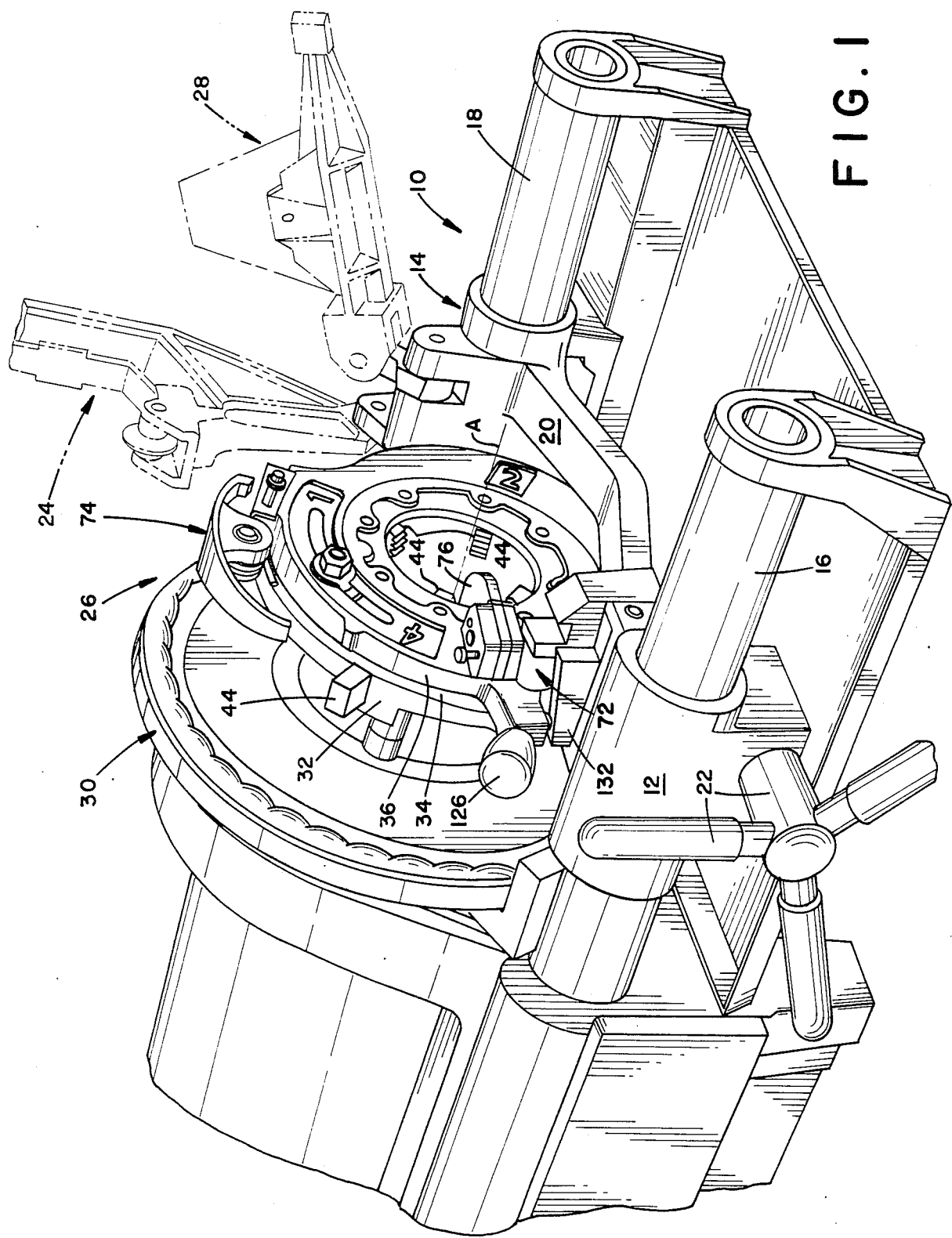
FIG. 1 is a perspective view of a portion of a threading machine and showing the die head of the present invention in its use position.

Referring now in greater detail to the drawings wherein the showings are for the purpose of illustrating preferred embodiments of the invention only and not for the purpose of limiting the invention, FIG. 1 shows a threading machine tooling carriage 10 having laterally opposite sides 12 and 14 slidably received on support rails 16 and 18, respectively. Carriage sides 12 and 14 are laterally interconnected by a cross member 20 and, as described in greater detail hereinafter, the underside of guide rail 16 is provided with teeth which engage a pinion supported in side 12 of the carriage and which is rotatable by means of an operating handle 22 to displace the tooling carriage in opposite directions along support rails 16 and 18. Side 14 of the tooling carriage supports a workpiece cutting tool 24, a thread cutting die head 26, and a workpiece reaming tool 28, each of which tools is pivotally supported on side 14 of the carriage for independent displacement between its use position as shown for die head 26 and its storage position as shown for the cutting and reaming tools. As is well known, the threading machine includes a workpiece chuck assembly 30 which is driven to rotate a workpiece about machine axis A and, during a workpiece threading operation, the tools 24, 26 and 28 are independently displaced from their storage positions to their use positions and are axially positioned relative to the workpiece through operating handle 22 for each tool to perform its particular function.

With reference now in particular to FIGS. 2-6 in conjunction with FIG. 1, thread cutting die head 26 is comprised of an annular support plate 32 and a cam plate assembly which includes an annular cam plate 34 and an annular cam locking plate 36. The die head assembly is pivotally mounted on carriage side 14 by means of a pin 38 on support plate 32 and which pin is received in an opening therefor in side 14 of the carriage. In the use position, the die head is vertically supported by pin 38 on one side and by a positioning lug 40 on the opposite side of support plate 32 and which engages in a positioning slot defined on side 12 of the carriage by a pair of upstanding projections 42. Support plate 32 carries a plurality of thread cutting dies 44 each disposed in a corresponding radially extending pocket 46 which opens toward cam plate 34. Each of the cutting dies 44 is provided with a slot 48 facing cam plate 34, and the cam plate includes radially and circumferentially extending arcuate cam fingers 50 each engaging in the slot of the corresponding cutting die 44. Accordingly, it will be appreciated that rotation of cam plate 34 relative to support plate 32 in opposite directions about axis A provides for the cutting dies 44 to be radially displaced inwardly and outwardly relative to the die head assembly and axis A.

Figure 2:
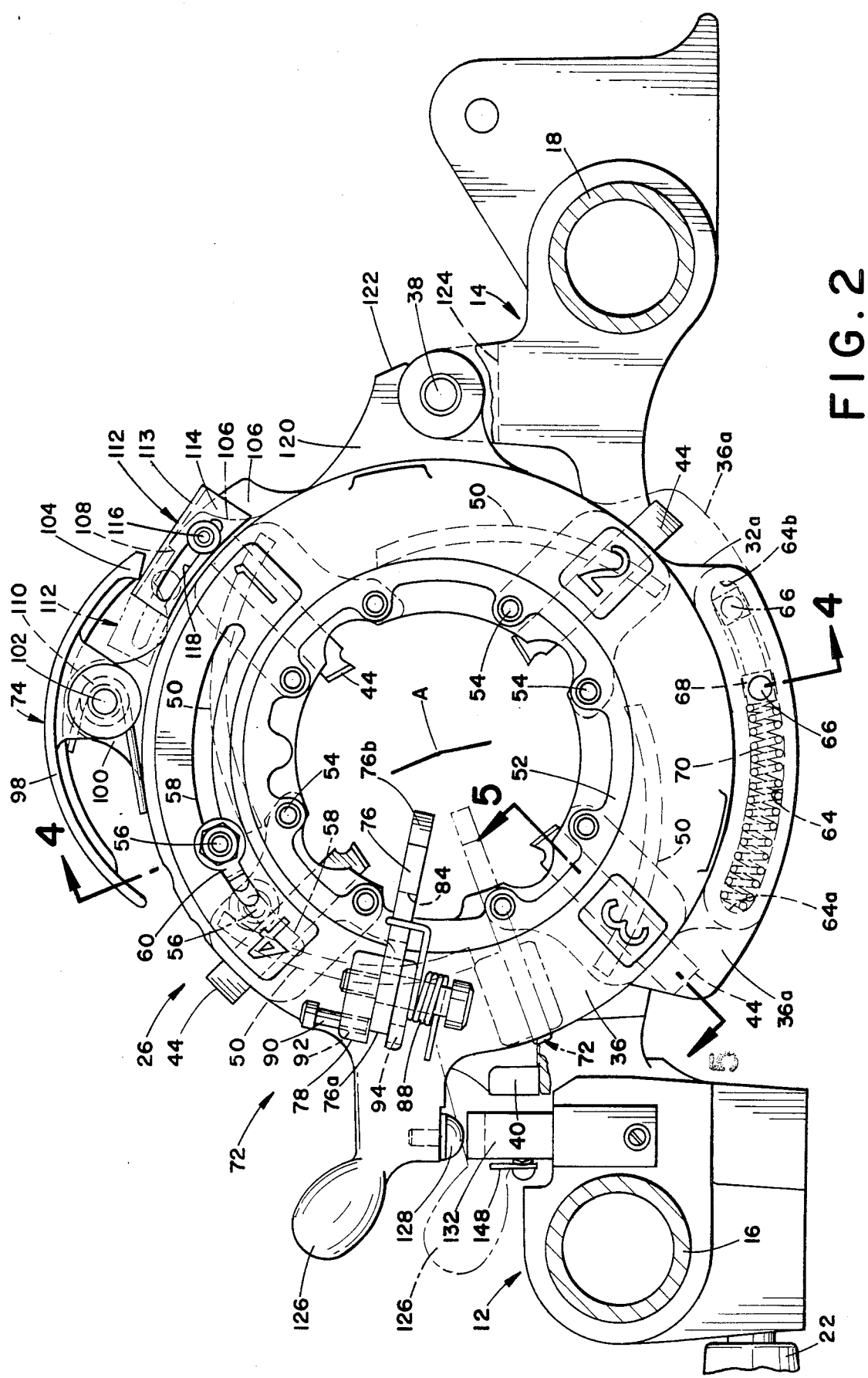
FIG. 2 is an end elevation view of the die head looking in the direction from right to left in FIG. 1.
Figure 4:
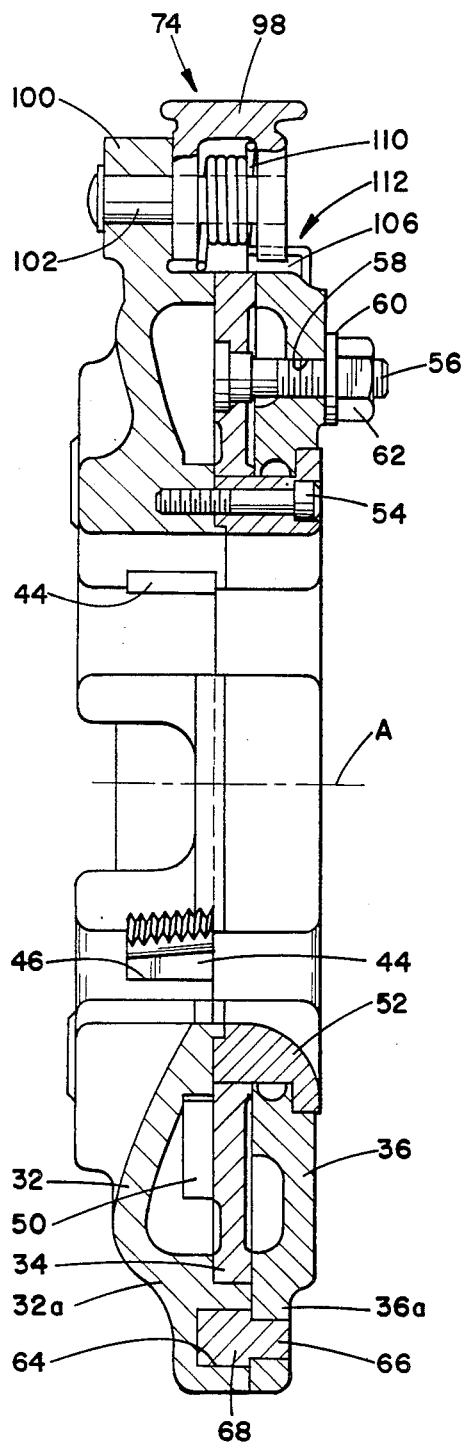
FIG. 4 is a cross-sectional elevation view of the die head taken along line 4—4 in FIG. 2.

As best seen in FIGS. 2 and 4 of the drawing, support plate 32, cam plate 34 and cam locking plate 36 are axially interengaged by an annular retaining ring 52 which is attached to support plate 32 by means of a plurality of bolts 54. Cam plate 34 and cam locking plate 36 are axially captured between support plate 32 and retaining ring 52 in a manner which provides for plates 34 and 36 to be rotatable about axis A relative to one another and relative to support plate 32. Cam plate 34 and cam locking plate 36 are adapted to be releaseably interengaged against relative rotation therebetween by means of a stud 56. Stud 56 is fixed on cam plate 34 and extends axially through an arcuate slot 58 in cam locking plate 36 to receive a washer 60 and a nut 62 which engages against washer 60. It will be appreciated that loosening of nut 62 releases cam plate 34 for pivotal displacement relative to support plate 32 and cam locking plate 36 to the extent provided by the circumferential length of slot 58. This relative pivotal displacement facilitates initial adjustment and setting of the radial positions of the cutting dies 44 in accordance with a given diameter of workpiece to be threaded. Tightening of nut 62 against washer 60 then interengages cam plate 34 in cam locking plate 36 against relative pivotal displacement therebetween. Thereafter, and in a manner described hereinafter, radial displacement of cutting dies 44 accompanies pivotal displacement of the die plate assembly relative to support plate 32.

As will be appreciated from FIGS. 2 and 4 of the drawing, support plate 32 has a lower flange 32a provided with a circumferentially extending arcuate recess 64, and cam locking plate 36 has a similar flange 36a provided with a stud 66 having an enlarged inner end 68 slidably disposed in recess 64. A constant force biasing spring 70 is disposed in recess 64 between inner end 68 of stud 66 and end 64a of recess 64, and spring 70 biases stud 66 toward end 64b of recess 64 and thus biases cam locking plate 36 and cam plate 34 counterclockwise in FIG. 2 about axis A. For the purpose which will be set forth more fully hereinafter, the cam plate assembly defined by cam plate 34 and cam locking plate 36 is pivotally displacable relative to support plate 32 about axis A between latched and retracted positions relative to support plate 32. In FIG. 2, the solid line positions of stud 66 and flange 36a of cam locking plate 36 depict the latched position of the cam plate assembly relative to support plate 32 and the broken positions of the stud and flange 36a depict the retracted position of the cam plate assembly. Accordingly, it will be appreciated that when the cam plate assembly is in the latched position it is biased toward the retracted position by spring 70.

Figure 3:
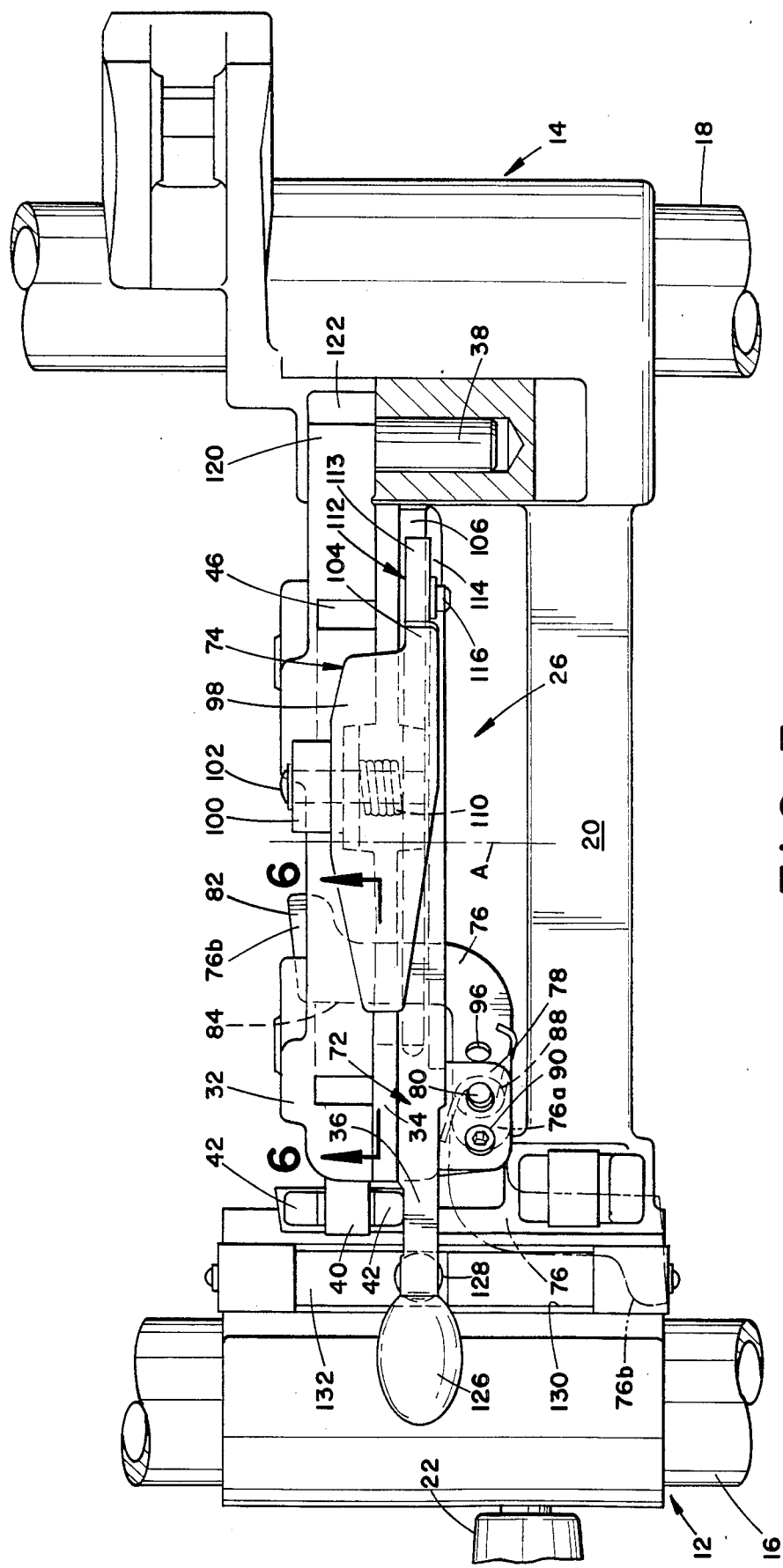
FIG. 3 is a plan view of the die head.
Figure 6:
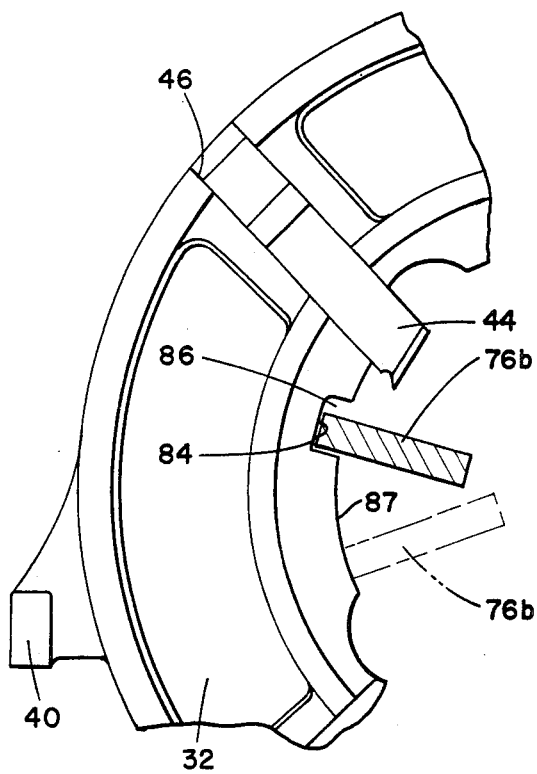
FIG. 6 is a detail sectional elevation view taken along line 6—6 in FIG. 3.
Figure 5:
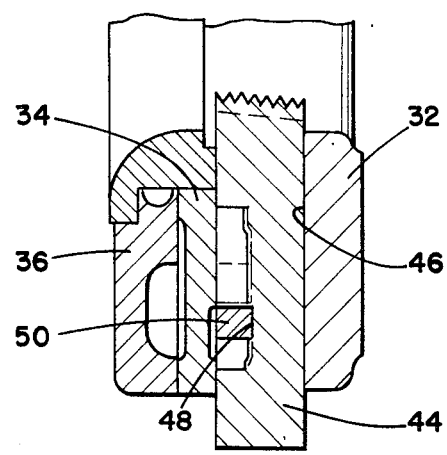
FIG. 5 is a cross-sectional view taken along line 5—5 in FIG. 2.

For the reasons set forth hereinafter, the thread cutting die head has independent and selectively operable latch assemblies 72 and 74 for releaseably holding the cam plate assembly in the latched position thereof against the bias of spring 70. As best seen in FIGS. 2, 3 and 6 of the drawing, latch assembly 72 includes a latch member 76 having an end 76a pivotally interengaged with a mounting arm 78 on cam locking plate 36 by means of a pivot pin 80. End 76b of latch 76 extends axially through the die head opening and has a generally radially extending end edge 82 facing a workpiece to be threaded. End 76b also has an axially extending side edge 84 engaging in a radially inwardly opening recess 86 in support plate 32 when the cam plate assembly is in the latched position. Support plate 32 has an arcuately extending inner edge 87 against which edge 84 of latch 76 engages when the cam plate assembly is in the retracted position, as shown by the broken line position of latch end 76b in FIG. 6 of the drawing. Latch 76 is biased counterclockwise in FIG. 3 by means of a coil spring 88 surrounding pin 80 and having its opposite ends engaging against cam locking plate 36 and latch 76. Latch 76 is shown in FIGS. 2 and 3 in its operative position and in which it functions as described hereinafter and, for the purpose set forth hereinafter, latch 76 is adapted to be displaced to and retained in an inoperative or stored position as represented by the broken line position of latch 76 in FIG. 3. In this respect, mounting arm 78 is provided with a pin 90 and aligned holes 92 and 94 above and below latch 76, and latch 76 is provided with a hole 96 on the opposite side of pin 80 from pin 90 and spaced from pin 80 for alignment with holes 92 and 94 when latch 76 is displaced clockwise in FIG. 3 approximately 180° from the solid line position thereof. When the latch is so positioned, pin 90 is displaced through latch hole 96 and into hole 94 in the mounting arm to retain the latch in the stored position thereof against the return bias of spring 88.

As best seen in FIGS. 2, 3 and 4 of the drawing, latch assembly 74 includes a latch lever 98 pivotally interconnected with a mounting arm 100 on support plate 32 by means of a pivot pin 102. Lever 98 has a nose portion 104 overlying cam locking plate 36, and the cam locking plate is provided with a radially outwardly extending projection 106 provided with a shoulder 108 which defines a keeper for latch lever 98 when latch assembly 74 is in use. Nose 104 of the latch lever is biased clockwise in FIG. 2 by means of a coil spring 110 surrounding pin 102 and having its opposite ends engaging against support plate 32 and the underside of latch lever 98. A cover 112 having a top portion 113 and a side portion 114 is mounted 15 on projection 106 by means of a screw 116 for top portion 113 to underlie latch nose 104 and prevent interengagement thereof with shoulder 108 when latch assembly 74 is in its inoperative position as shown in FIGS. 2 and 3 of the drawing. Side 114 of the cover is provided with a slot 118 which enables displacement of the cover to the right in FIG. 2 to expose shoulder 108 for engagement by latch nose 104 in the manner and for the purpose set forth hereinafter.

As mentioned hereinabove, thread cutting die head 26 is pivotally mounted on side 14 of carriage 10 by means of pin 38 on support plate 32. As will be seen from FIGS. 2 and 3 of the drawing, pin 38 is fixed to a mounting projection 120 on support plate 32, and mounting projection 120 is provided with a stop surface 122 which is adapted to facially engage against a stop surface 124 on carriage side 14 when the threading die head assembly is pivoted clockwise in FIG. 2 about the axis of pin 38 to its storage position. In the storage position, the die head is supported laterally outwardly adjacent carriage side 14 as shown with respect to tools 24 and 28 in FIG. 1 of the drawing. Cam locking plate 36 is provided with an operating handle 126 projecting radially outwardly thereof generally diametrically opposite pin 38, and handle 126 is provided on the underside thereof with a button 128 which serves the purpose set forth hereinafter. Handle 126 facilitates pivotal displacement of die head assembly 26 about the axis of pin 38 between the use and storage positions of the die head assembly and, additionally, facilitates displacing the cam plate assembly from the retracted to the latched position thereof when the die head assembly is in its storage position with stop surfaces 122 and 124 in facial engagement with one another. More particularly in this respect, it will be appreciated from the foregoing description that when the cam plate assembly defined by cam plate 34 and cam locking plate 36 is in the retracted position thereof the component parts including stud 66, flange 36a, latch assembly 72, projection 106 and the cover thereon, bolt 56 and slot 58 are in the broken line positions thereof shown in FIG. 2, and end 76b of latch 76 is in the broken line position thereof shown in FIG. 6 of the drawing. In order to displace the cam plate assembly to the latched position thereof, the die head assembly 26 is pivoted clockwise in FIG. 2 to the storage position thereof in which stop surfaces 122 and 124 are in facial engagement. Handle 126 is then urged clockwise to pivot the cam plate assembly about axis A relative to support plate 32 and against the bias of spring 70 until side edge 84 of latch 76 is displaced along inner edge 87 of support plate 32, clockwise with respect to FIG. 6, to the extent necessary for latch end 76b to be biased into slot 86 in support plate 32. When handle 126 is then released, the cam plate assembly is releaseably latched against return to the retracted position under the influence of biasing spring 70.

Further based on the foregoing description, it will be appreciated that the relative circumferential positions of cam plate 34 and cam locking plate 36 as determined by bolt 56 establishes the radially outermost positions for thread cutting dies 44 relative to axis A for a given size diameter workpiece to be threaded. The radial outermost positions of the cutting dies provide for the latter to radially clear the outer surface of the workpiece when the cam plate assembly is in its retracted position. When the cam plate assembly is displaced from its retracted to its latched position in the manner described above, the pivotal displacement of the cam plate assembly about axis A relative to support plate 32 displaces thread cutting dies 44 radially inwardly toward axis A the appropriate distance to properly position the cutting dies to engage and cut a thread on a workpiece.

Broadly, in connection with controlling the taper and length of a tapered thread cut with the die head of the present invention, the cam plate assembly is displaced to its latched position through the use of latch assembly 72 as described above, and the die head is then displaced to the use position. In the use position, the die head is manually advanced toward the workpiece by means of carriage operating handle 22 until end 76b of latch member 76 engages the end of the workpiece to release the cam plate assembly for displacement toward the retracted position thereof under the influence of biasing spring 70. More particularly, end edge 82 of latch member 76 engages the end of the workpiece, whereupon the latch is pivoted clockwise in FIG. 6 to release the cam plate assembly. Upon release of the cam plate assembly button 128 on arm 126 engages a cam or ramp component supported thereunder on the corresponding side of the carriage and, during the thread cutting operation, button 128 and thus arm 126 follow the contour of the ramp which provides for the cam plate assembly to pivot counterclockwise in FIG. 2 under the influence of biasing spring 70 to gradually retract thread cutting dies 44 radially outwardly of axis A. When the desired length of the tapered thread is reached as determined by the length of the ramp in the direction of cutting, button 128 drops off the end of the ramp whereby the cam plate assembly is quickly rotated counterclockwise by spring 70 back to the retracted position thereof to withdraw thread cutting dies 44 radially out of engagement with the workpiece.

A preferred cam or ramp assembly by which the foregoing tapered thread cutting control is achieved is illustrated in FIGS. 7–10 of the drawing. With reference now to these Figures, it will be seen that side portion 12 of the tool carriage 10 is provided with a longitudinally extending recess 130 laterally inwardly adjacent the opening for support rail 16, and a cam or ramp component 132 is supported in recess 130 for longitudinal and vertical displacement relative to the carriage side. More particularly in this respect, ramp component 132 is axially slidably received on a support and guide rod 134 having each of its opposite ends received in a corresponding guide block 136 which is retained in place at the corresponding end of recess 130 by means of a sheet metal cover element 138. Each guide block 136 is provided with a vertical guide slot 140, and a biasing spring 142 is interposed between the underside of each end of guide rod 134 and the bottom of recess 130, whereby guide rod 134 is biased upwardly for the opposite ends thereof to normally engage the upper end of the corresponding guide slot 140. Ramp component 132 is displacable in opposite directions along guide rod 134 and is biased to the left in FIG. 9 by means of a coil spring 144 interposed between the ramp and guide block 136 at the right hand end of recess 130. Guide rod 134 is provided with a collar 146 adjacent the other guide block 136 and which provides a stop for ramp 132 in the direction of bias of spring 144. For the purpose set forth hereinafter, ramp 132 is displacable to the right in FIG. 9 along guide rod 134 and against the bias of spring 144, and the ramp carries a latch 148 which is pivotal clockwise in FIG. 9 to engage about the outer end of cover 138 to hold ramp 132 in a storage position relative to carriage side 12.

Figure 9:
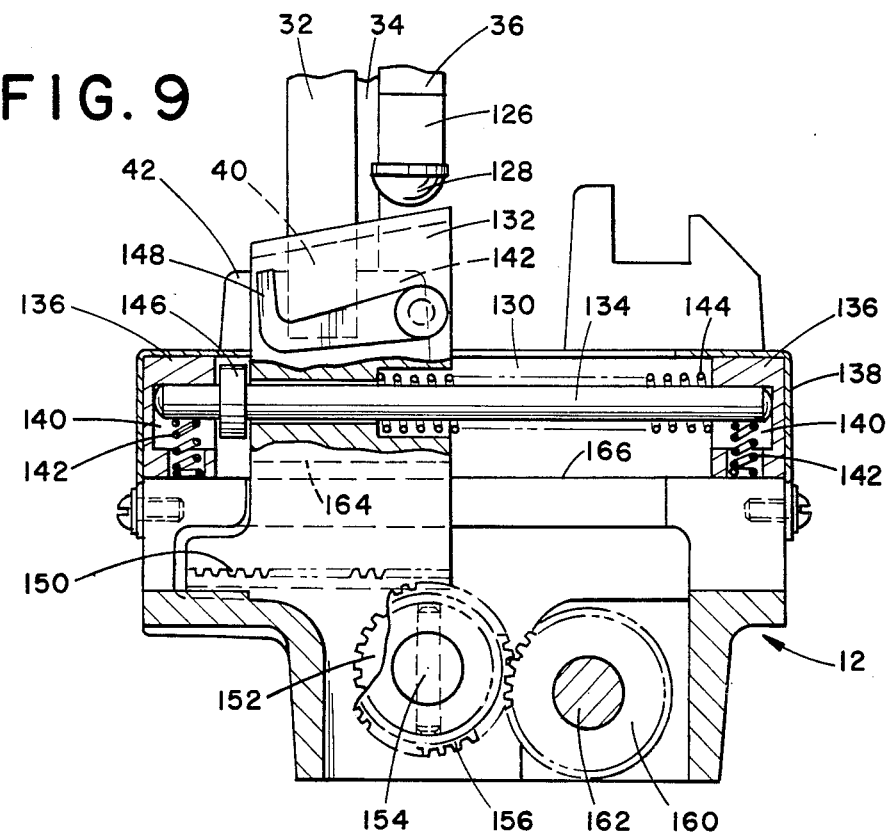
FIG. 9 is a cross-sectional elevation view of the carriage taken along line 9—9 in FIG. 7; and, FIG. 10 is a cross-sectional elevation view of the carriage taken along line 10—10 in FIG. 8.
Figure 10:
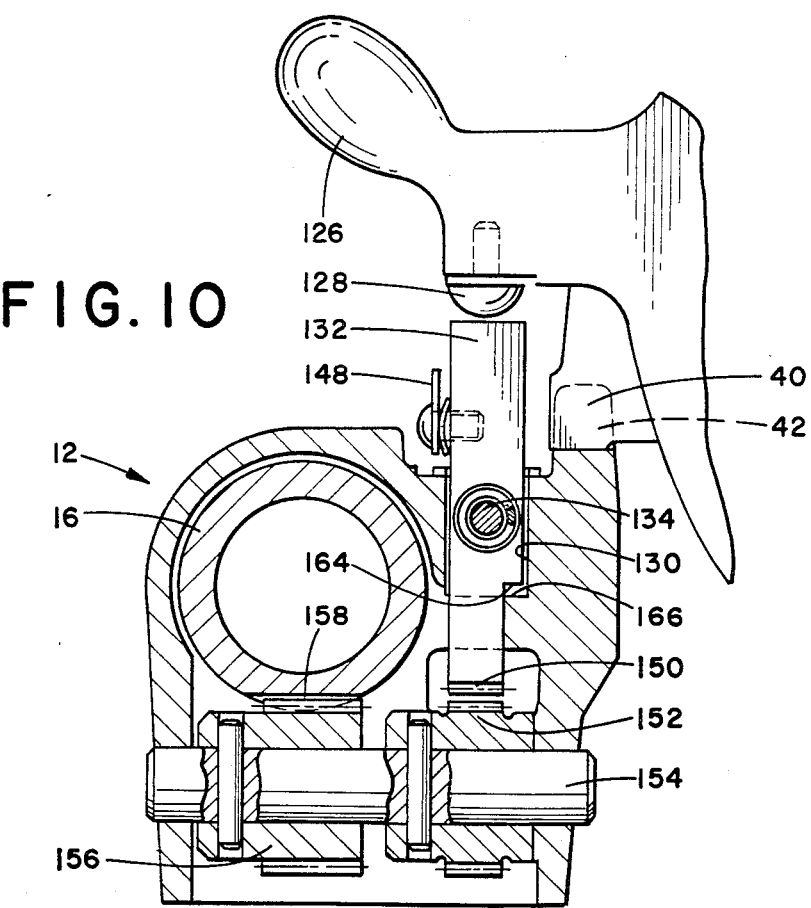

As will be appreciated from FIG. 9, guide rod 134 and thus ramp component 132 is vertically displacable relative to recess 130 and downwardly from the uppermost position shown in FIG. 9. The underside of ramp component 132 is provided with teeth 150 along the length thereof adapted to meshingly engage with the teeth of a pinion 152 supported therebeneath on shaft 154 rotatably mounted on the carriage side as shown in FIG. 10. Shaft 154 also carries a pinion 156 which is in continuous meshing engagement with teeth 158 provided on the underside of support rail 16, and pinion 156 is in meshing engagement with a pinion 160 mounted on a shaft 162 which is rotatably supported on the carriage side. Carriage operating handle 22 is mounted on the outer end of shaft 162, whereby it will be appreciated that rotation of operating handle 22 rotates pinion 160 which in turn rotates pinion 156 to impart longitudinal displacement to carriage 10 along support rails 16 and 18. It will be further appreciated that when ramp component 132 is in its upper position as shown in FIGS. 9 and 10, and thus disengaged from pinion 152, the ramp component is longitudinally displaced with the carriage. For the purpose set forth hereinafter, the lower portion of ramp component 132 is offset laterally inwardly to provide a planar surface 164 between the opposite ends thereof, and recess 130 is provided with a planar guide surface 166 which is spaced from and underlies surface 164 when ramp component 132 is in its upper position.

When die head assembly 26 has been manipulated to pivot the cam plate assembly thereof into its latched position through the use of latch assembly 72 which, as described hereinabove, prepares the die head for cutting a tapered thread, the die head assembly is then pivoted to its use position in which positioning lug 40 on support plate 32 engages carriage side 12 between projections 42 thereon to vertically and axially position the die head in readiness for operation. When so positioned, the end of a workpiece to be threaded would be to the left of the die head assembly in FIG. 9 and, as will be seen from FIGS. 9 and 10, button 128 on the underside of operating handle 126 is slightly spaced above the axially outer end of ramp component 132 when the die head is initially disposed in its use position. The upper surface of ramp component 132 is axially inclined downwardly in the direction toward the workpiece which provides for the control of the thread cutting operation as set forth hereinafter.

When the component parts are positioned as described above in readiness for cutting a tapered thread, carriage operating handle 22 is rotated to axially advance the carriage toward the workpiece. Upon interengagement of the end of the workpiece with end edge 82 of latch member 76, the latch member is pivoted to release the cam plate assembly for pivotal displacement relative to support plate 32 about axis A under the influence of biasing spring 70 and thus counterclockwise in FIG. 2. The thread cutting engagement between cutting dies 44 and the workpiece is initiated at this time and, upon release of the cam plate assembly, operating handle 126 is displaced downwardly for button 128 to engage ramp component 132 and displace the latter downwardly for teeth 150 thereon to interengage with pinion 152. Importantly, downward displacement of ramp component 132 is limited by interengagement of surface 164 thereof with recess surface 166. This interengagement assures vertical stability with respect to the ramp component during the thread cutting operation and, further, advantageously controls the vertical positioning of teeth 150 on the ramp component relative to the teeth of pinion 152 and thus assures achieving a desired meshing interengagement of the teeth.

As is well known, once the thread cutting dies actively engage the workpiece at the beginning of the thread cutting operation the carriage and thus the die head assembly is automatically displaced in the direction toward the workpiece under the influence of the cutting action. Therefore, as carriage 10 is advanced axially along the workpiece as a result of the cutting action between the cutting dies and rotating workpiece, pinion 156 is rotated clockwise in FIG. 9 as a result of its engagement with teeth 158 on the underside of support rail 16. Such clockwise rotation of pinion 156 and shaft 154 imparts corresponding clockwise rotation to pinion 152, and interengagement of pinion 152 with teeth 150 on the underside of ramp component 132 displaces the ramp component to the right in FIG. 9 relative to the carriage. Surface 164 of the ramp component slides relative to recess surface 166 during such displacement and, in connection therewith, surfaces 164 and 166 provide the further functions of support and guidance for the movement of the ramp component and stability against any tendency for the ramp component to rock longitudinally as a result of the downward force thereon from operating handle 126. It will be appreciated that displacement of ramp component 132 relative to the carriage during movement of the carriage toward the workpiece provides for the ramp component to have a fixed axial position relative to the workpiece. Therefore, as the carriage and die head assembly advance to the left in FIG. 9, such advancement is relative to ramp component 132, whereby the cam plate assembly through the sliding engagement of button 128 along the upper surface of the ramp component pivots counterclockwise in FIG. 2 under the influence of biasing spring 70 as the thread cutting progresses. The bias of spring 70 maintains a constant biasing force downwardly on ramp component 132 and independent of the torque which is applied to the die head through thread cutting dies 44 which are supported on support plate 32. Such counterclockwise rotation of the die plate assembly causes the gradual receding displacement of the thread cutting dies, and when button 128 reaches the lower end of the ramp the desired taper and length of thread has been cut. At that point, button 128 passes the lower end of the ramp component and the cam plate assembly is quickly displaced counterclockwise in FIG. 2 under the influence of biasing spring 70 to quickly retract the thread cutting dies from engagement with the workpiece, thus to terminate the thread cutting operation. Further in this respect, it will be appreciated that when button 128 drops from the lower end of ramp 132, the latter is released for spring 142 to bias the ramp component upwardly out of engagement with pinion 152, whereby biasing spring 144 is free to displace the ramp component back to its initial position upon withdrawal of the die head from the workpiece and pivotal movement of the die head from its use towards its storage position.

By employing a constant force pivotal biasing of the cam plate assembly relative to support plate 32 in connection with the cutting of a tapered thread, the die head construction according to the present invention advantageously enables the cutting of both right and left hand threads on workpieces simply by changing the thread cutting dies and reversing the direction of rotation of the workpiece during the threading operation. More particularly in this respect, it will be appreciated from the foregoing description that constant force biasing spring 70 operates to pivot the cam plate assembly relative to support plate 32 in the direction for button 128 on arm 126 to engage ramp component 132 independent of the torque imposed on support plate 32 during engagement of the thread cutting dies with the workpiece. Therefore, the direction of the torque force generated during the thread cutting operation has no effect on the control of the taper and length of the thread, whereby either left or right hand threads can be cut simply by employing the appropriate thread cutting dies and direction of workpiece rotation.

If it is desired to cut a straight thread on the workpiece, latch member 65 of latch assembly 72 is displaced to its stored position as described hereinabove, and screw 116 is loosened for cover 112 to be displaced to the right in FIG. 2 to expose keeper shoulder 108. Thereafter, pivotal displacement of the cam plate assembly relative to support plate 32, with the die head in its storage position and stop surfaces 122 and 124 in facial engagement as described hereinabove, displaces projection 106 and thus shoulder 108 clockwise in FIG.

2 about axis A allowing nose 104 of latch lever 98 to pivot clockwise about pin 102 and engage against shoulder 108 to hold the cam plate assembly in the latched position against the bias of spring 70.

Further in connection with the cutting of a straight thread, ramp component 132 is displaced to the right along guide 134 and is locked in its storage position by means of latch 148 as described hereinabove, whereby the ramp component is maintained out of the path of arm 126 of the cam plate assembly when the latter is manually released at the end of the thread cutting operation to pivot counterclockwise in FIG. 2. More particularly in this respect, ramp 132 is not engaged by button 128 during the cutting of a straight thread, whereby it will be appreciated that the ramp remains in its upper position and thus moves with the carriage. Therefore, if the ramp was not disposed in its stored position, it would underlie button 128 throughout the cutting of a straight thread and would prevent the cam plate assembly from pivoting to the extent necessary to disengage cutting dies 44 from the workpiece at the end of the thread cutting operation. When the ramp is latched in its storage position the die head assembly is then pivoted about pin 38 to its use position with positioning lug 40 engaging the recess between projections 42, and the die head is advanced towards the end of the workpiece by means of operating handle 22 of the carriage assembly for the cutting dies to engage and cut a straight thread on the end of the workpiece. When the desired axial length of thread has been cut, latch lever 98 is manually pivoted counterclockwise about pin 102 with respect to FIG. 2 to release nose 104 from shoulder 108, and biasing spring 70 then immediately displaces the cam plate assembly counterclockwise in FIG. 2 to the retracted position thereof to radially withdraw thread cutting dies 44 from engagement with the workpiece.

While considerable emphasis has been placed on the preferred embodiments illustrated and described herein, it will be appreciated that many changes can be made in the preferred embodiments without departing from the principles of the present invention. In particular, it will be appreciated that the control of the receding displacement of the thread cutting dies under the influence of the spring bias of the cam plate assembly can be achieved through a cam or ramp arrangement other than the preferred arrangement disclosed and in which the ramp component is positively driven relative to the carriage. For example, the ramp could be of the character disclosed in the Miyagawa patent referred to herein and, in such case, would be displaced downwardly into engagement with the support rail of the threading machine and held thereagainst by the spring bias. It will likewise be understood that the preferred ramp arrangement disclosed herein for controlling the taper and length of cut of a tapered thread can be used to advantage with thread cutting die heads of the type disclosed in the Miyagawa patent and, in such case, the torque developed during the cutting of a thread would bias the ramp component downwardly into engagement with the driven pinion by which the ramp is positively displaced relative to the carriage during the thread cutting operation. Moreover, latch arrangements other than those illustrated and described in connection with the preferred embodiment can be devised to provide the functions disclosed therefor. These and other embodiments and modifications of the preferred embodiments will be obvious and suggested to those skilled in the art from the disclosure herein, whereby it is to be distinctly understood that the foregoing descriptive matter is to be interpreted merely as illustrative of the present invention and not as a limitation.

Having thus described the invention, it is claimed:

1. An annular thread cutting die head for a power driven threading machine, said die head having an axis and an entrance end with respect to a workpiece to be threaded and comprising a plurality of thread cutting dies inwardly of said entrance end with respect to the direction of threading a workpiece, annular support plate means supporting said cutting dies for displacement radially inwardly and outwardly of said axis, annular cam plate means coaxial with said support plate means, said support plate means and cam plate means being interengaged for relative pivotal displacement in opposite directions about said axis, said cam plate means including means to displace said cutting dies radially inwardly and outwardly relative to said axis in response to said pivotal displacement in opposite directions about said axis, cam plate biasing interengaging said support plate means and said cam plate means and biasing said cam plate means to pivot about said axis in the direction to displace said cutting dies radially outwardly of said axis, said cutting dies having radially outwardmost positions relative to said axis, first latch means pivotally mounted on one of said support plate means and cam plate means, first keeper means on the other of said plate means, said latch means and keeper means releaseably interengaging said support plate means and cam plate means in a fixed relative angular position therebetween against the bias of said cam plate biasing means and in which angular position said cutting dies are positioned radially inwardly of said outwardmost positions, and said first latch means including actuator means adjacent said entrance end and engaged by a workpiece to disengage said first latch means from said first keeper means as said workpiece approaches said cutting dies in said direction of threading.

2. A die head according to claim 1, wherein said cam plate biasing means includes coil spring means having opposite ends respectively acting circumferentially against said support plate means and said cam plate means.

3. A die head according to claim 1, wherein said support plate means and cam plate means have a radially inner periphery, and said actuator means projects radially inwardly of said inner periphery.

4. A die head according to claim 3, wherein said latch means is pivotal to an inoperative position in which said actuator means is radially outwardly located relative to said inner periphery, and means to hold said latch means in said inoperative position.

5. A die head according to claim 1, wherein said support plate means and cam plate means have radially outer peripheries, and second latch means pivotally mounted on the outer periphery of said one of said plate means and second keeper means on the outer periphery of the other of said plate means.

6. A die head according to claim 5, and selectively operable means to prevent said second latch means from engaging with said second keeper means.

7. A die head according to claim 5, wherein each said first and second latch means has an inoperative position with respect to the corresponding keeper means therefor, and means to hold each said first and second latch means in its inoperative position.

8. A die head according to claim 7, wherein said plate biasing means includes coil spring means having opposite ends respectively acting circumferentially against said support plate means and said cam plate means.

9. A die head according to claim 1, wherein said cam plate means includes a cam plate and a cam locking plate, said cam plate being axially between said support plate means and said cam locking plate and including said means to displace said cutting dies radially inwardly and outwardly of said axis.

10. A die head according to claim 9, wherein said cam plate is pivotal about said axis relative to said cam locking plate to adjust the radial positions of said cutting dies relative to said support plate means and said locking plate, and means releasably interconnecting said cam plate and locking plate against relative pivotal displacement about said axis.

11. A die head according to claim 10, wherein said plate biasing means includes circumferentially extending coil spring means disposed in a recess in said support plate means, and pin means fixed on said cam locking plate and circumferentially engaging against an end of said coil spring means.

12. A die head according to claim 11, wherein said support plate means and cam plate means have radially inner and outer peripheries, said first latch means being pivotally mounted on said cam locking plate, said first keeper means being on the inner periphery of said support plate means, a first latch spring biasing said first latch means toward engagement with said first keeper means, second latch means pivotally mounted on the outer periphery of said support plate means, second keeper means on the outer periphery of said cam locking plate, and second latch spring biasing said second latch means toward engagement with said second keeper means.

13. A die head according to claim 12, wherein each said first and second latch means has an inoperative position with respect to the corresponding keeper means therefor, and means to hold each said first and second latch means in its inoperative position.

14. A die head according to claim 1, and carriage means for mounting said die head on spaced apart parallel rails of a threading machine for longitudinal displacement in opposite directions therealong, said carriage means including opposite side portions each slidably receiving one of said rails, means interconnecting said support plate means and one of said side portions for pivotal movement of said die head relative to said carriage between storage and use positions in which said die head is respectively positioned laterally outwardly of said one side portion and laterally between said side portions, and means interengaging said support plate means and the other of said side portions of said carriage to axially and horizontally locate said die head in said use position.

15. A die head according to claim 14, and longitudinally extending ramp means on said other side portion of said carriage means, said cam plate means including ramp follower means overlying said ramp means in said use position of said die head, and said biasing means urging said cam plate means to pivot relative to said support plate means in the direction to urge said follower means downwardly against said ramp means.

16. A die head according to claim 15, wherein said ramp means and said other side portion of said carriage means are longitudinally displacable together and relative to one another and said ramp means is supported on said other side portion for vertical displacement between upper and lower positions relative thereto, said ramp means being longitudinally displacable with said other side portion when in said upper position, and said ramp means and other side portion being relatively displacable longitudinally when said ramp means is in said lower position.

17. A die head according to claim 14, wherein said ramp means and said other side portion include means interengaging to locate said ramp means in said lower position thereof.

18. A die head according to claim 16, and drive means engaging said ramp means in said lower position thereof, said drive means longitudinally displacing said ramp means in response to longitudinal displacement of said carriage means along said rails and in the direction opposite the direction of displacement of said carriage means.

19. A die head according to claim 15, wherein said support plate means and said one side portion of said carriage means include interengaging means to stop pivotal displacement of said die head in the direction from said use toward said storage position, said cam plate means including handle means for pivoting said cam plate means relative to said support plate means when said die head is in the storage position and in the direction to displace said cutting dies radially inwardly of said axis of said die head to initial cutting positions, said first latch means and said first keeper means interengaging said support plate means and said cam plate means to releasably hold said cutting tools in said cutting positions.

20. A die head according to claim 19, wherein said ramp means and said other side portion of said carriage means are longitudinally displacable together, and relative to one another and said ramp means is supported on said other side portion for vertical displacement between upper and lower positions relative thereto, said ramp means being longitudinally displacable with said other side portion when in said upper position, and said ramp means and other side portion being relatively displacable longitudinally when said ramp means is in said lower position.

21. A die head according to claim 20, wherein said ramp means and said other side portion include means interengaging to locate said ramp means in said lower position thereof.

22. A die head according to claim 20, wherein said ramp follower means in said use position of said die head is out of engagement with said ramp means when said first latch means and first keeper means engage said support plate means and cam plate means to hold said cutting tools in said initial cutting positions, said actuator means releasing said cam plate means for said biasing means to displace said ramp follower means against said ramp means to displace said ramp means to said lower position thereof.

23. A die head according to claim 22, and drive means engaging said ramp means in said lower position thereof to longitudinally drive said ramp means in response to longitudinal displacement of said carriage means along said rails and in the direction opposite the direction of displacement of said carriage means.

24. A die head according to claim 23, wherein said drive means includes pinion means on said other side portion of said carriage means, said ramp means including gear teeth means, and said means interengaging to locate said ramp means in said lower position being operable to relatively position said pinion means and gear teeth means for meshing engagement when said ramp means is in said lower position.

25. Threading apparatus for a threading machine having an axis, comprising a pair of support rails parallel to and laterally spaced from said axis, carriage means supported on said rails for movement in axially opposite directions therealong, one of said directions being a threading direction, die head means mounted on said carriage means for movement therewith in said opposite directions, said die head means including thread cutting dies and plate means pivotal relative to said axis to radially displace said cutting dies to cut a thread of predetermined length and taper on an end of a workpiece during movement of said carriage means in said threading direction, ramp means for controlling said length and taper, said ramp means being mounted on said carriage means adjacent one of said support rails for vertical displacement relative to said carriage means between upper and lower positions and for axial displacement with and relative to said carriage means, said plate means including actuator means for displacing said ramp means from said upper to said lower position, and ramp drive means on said carriage means engaging said ramp means in said lower position thereof to displace said ramp means axially relative to said carriage means during movement of said carriage means in said threading direction.

26. Threading apparatus according to claim 25, wherein said ramp means and carriage means include means interengaging to locate said ramp means in said lower position and to support said ramp means during said axial displacement thereof relative to said carriage means.

27. Threading apparatus according to claim 26, wherein said means interengaging to locate said ramp means includes a planar surface on each said ramp means and carriage means.

28. Threading apparatus according to claim 25, wherein said drive means includes pinion means on said carriage means and rotatable in response to displacement of said carriage means along said support rails, and teeth on said ramp means engaging with said pinion means when said ramp means is in said lower position.

29. Threading apparatus according to claim 28, wherein said ramp means and said carriage means include means interengaging when said ramp means is in said lower position to relatively position said pinion means and said teeth on said ramp means for meshing engagement.

30. Threading apparatus according to claim 29, wherein said means interengaging when said ramp means is in said lower position further supports said ramp means during said axial displacement thereof relative to said carriage means.

31. Threading apparatus according to claim 30, wherein said pinion means includes a first pinion for engaging said teeth on said ramp means and a second pinion for driving said first pinion, and teeth on said one support rail engaging said second pinion to rotate said second pinion in response to displacement of said carriage means along said support rails.

32. Threading apparatus according to claim 25, and means biasing said ramp means to disengage said drive means.

33. Threading apparatus according to claim 25, and means biasing said ramp means in said threading direction relative to said carriage means.

34. Threading apparatus according to claim 25, wherein said carriage means has an axially outer end and said ramp means has a storage position toward said outer end of said carriage means, and means to releasably retain said ramp means in said storage position.

35. Threading apparatus according to claim 25, wherein said carriage means adjacent said one support rail includes an axially extending recess receiving said ramp means, guide rod means in said recess and having axially opposite ends, said ramp means being axially slidably supported by said guide rod means, said guide rod means being supported on said carriage means for vertical displacement between upper and lower positions to respectively support said ramp means in said upper and lower positions thereof, and means biasing said guide rod means to said upper position thereof.

36. Threading apparatus according to claim 35, wherein said recess and ramp means include corresponding axially extending planar surfaces interengaging to support said ramp means in said lower position thereof.

37. Threading apparatus according to claim 35, wherein said means biasing said guide rod means includes spring means between said carriage means and guide rod means at said opposite ends of said guide rod means.

38. Threading apparatus according to claim 37, and spring means biasing said ramp means along said guide rod means in the direction of threading.

39. Threading apparatus according to claim 38, wherein said drive means includes a first pinion in said recess beneath said ramp means, teeth on said ramp means engaging said first pinion when said ramp means is in said lower position thereof, gear teeth on said one of said support rails, and a second pinion on said carriage means for driving said first pinion, said second pinion engaging said teeth on said one support rail for said second pinion to rotate in opposite directions in response to movement of said carriage means in said opposite directions along said support rails.

40. Threading apparatus according to claim 39, wherein said recess and ramp means include corresponding axially extending planar surfaces interengaging to support said ramp means in said lower position thereof with said teeth on said ramp means positioned in meshing engagement with said first pinion.

41. Threading apparatus according to claim 40, wherein said carriage means has an axially outer end and said ramp means has a storage position toward said outer end of said carriage means, and means to releasably retain said ramp means in said storage position.

* * * * *